US006434482B1

(12) United States Patent
Oshida et al.

(10) Patent No.: US 6,434,482 B1
(45) Date of Patent: Aug. 13, 2002

(54) ON-VEHICLE NAVIGATION SYSTEM FOR SEARCHING FACILITIES ALONG A GUIDE ROUTE

(75) Inventors: Naoya Oshida, Tokyo; Shigehito Takahashi, Yokohama, both of (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/599,237

(22) Filed: Jun. 22, 2000

(30) Foreign Application Priority Data

Jul. 12, 1999 (JP) ............................................ 11-196868

(51) Int. Cl.⁷ ........................ G01C 21/00; G08G 1/0969
(52) U.S. Cl. ........................ 701/209; 701/201; 701/211; 340/995
(58) Field of Search ............................... 701/200, 211, 701/201, 209; 340/995

(56) References Cited

U.S. PATENT DOCUMENTS

| 4,761,742 A | | 8/1988 | Hanabusa et al. | |
|---|---|---|---|---|
| 5,229,947 A | * | 7/1993 | Ross et al. | 364/443 |
| 5,515,283 A | * | 5/1996 | Desai et al. | 364/443 |
| 5,543,789 A | * | 8/1996 | Behr et al. | 340/995 |
| 5,654,892 A | * | 8/1997 | Fujii et al. | 364/449.5 |
| 5,767,795 A | * | 6/1998 | Schaphorst | 340/988 |
| 5,790,973 A | * | 8/1998 | Blaker et al. | 701/123 |
| 5,802,492 A | * | 9/1998 | DeLorme et al. | 701/200 |
| 6,014,090 A | * | 1/2000 | Rosen et al. | 340/905 |
| 6,175,800 B1 | * | 1/2001 | Mori et al. | 701/202 |

* cited by examiner

Primary Examiner—Michael J. Zanelli
(74) Attorney, Agent, or Firm—Brinks Hofer Gilson & Lione (57) ABSTRACT

While the vehicle is traveling on a highway, the controller searches facilities located within a specific distance from the next exit of the highway, on the basis of the map data contained in the CD-ROM and the current vehicle position measured by a position measuring device, and provides the result to a display controller. The display controller superimposes on a displayed map image on a monitor the searched facilities as well as the distances from the relevant highway exit. The controller also searches a guide route to a facility selected by the user, stores it in a route guide memory, and executes route guidance to the facility on the basis of the guide route stored in the guide route memory. Thus, the invention provides a navigation system whereby the user can find facilities located within a specific distance from the next exit of the highway.

18 Claims, 6 Drawing Sheets

ILLUSTRATION OUTLINE OF THE INVENTION

ILLUSTRATION OUTLINE OF THE INVENTION

EXPLANATORY CHART OF A FACILITY LIST PL NEAR A HIGHWAY EXIT

| HIGHWAY EXIT NAME | FACILITIES | LONGITUDE/LATITUDE |
|---|---|---|
| OOO IC EXIT ON THE UP LINE | GAS STATION ×× | x1 , y1 |
| | RESTAURANT OOO | x2 , y2 |
| | RESTING PLACE △△△ | x3 , y3 |
| | ⋮ | ⋮ |
| OOO IC EXIT ON THE DOWN LINE | GAS STATION ◇◇ | x1 , y1 |
| | RESTING PLACE ▽▽▽ | xm , ym |
| | RESTAURANT O×△ | xn , yn |
| | ⋮ | ⋮ |
| | ⋮ | ⋮ |

FIG. 4

FLOW CHART OF THE OPERATION OF THE FIRST EMBODIMENT

FIG. 5

BLOCK DIAGRAM OF THE NAVIGATION SYSTEM RELATING TO THE SECOND EMBODIMENT

FIG. 6

FLOW CHART OF THE OPERATION OF THE SECOND EMBODIMENT

ON-VEHICLE NAVIGATION SYSTEM FOR SEARCHING FACILITIES ALONG A GUIDE ROUTE

BACKGROUND OF THE INVENTION

1. Field of the Invention

The present invention relates to an on-vehicle navigation system that displays for searching facilities located within a specific distance from the next exit of a highway on which the vehicle is traveling, and facilities located within a specific distance from the vehicle which are located along the guide route.

2. Related Art

The navigation system includes a map data storage unit such as a CD-ROM, DVD-ROM, etc., which stores map data (hereafter, simply referred to as "CD-ROM"), a display unit, a GPS receiver, and a sensor that detects the current position and current orientation of the vehicle, such as a gyro and a speed sensor. The navigation system reads the map data for the area surrounding the current position of the vehicle from the data storage unit, draws on the display screen a map image surrounding the vehicle position on the basis of the map data, displays a vehicle position mark (location) superimposed on the display screen, scrolls the displayed map image in accordance with the movement of the vehicle, and moves the vehicle position mark with the map image fixed on the screen, so that the driver can determine exactly where the vehicle is traveling at a glance.

Further, the on-vehicle navigation system normally incorporates a guide route function, whereby the user can travel easily to a desired destination without taking the wrong roads. This guide route function automatically searches a route from the starting point to the destination according to the lowest cost, by using the map data and making a simulation calculation using the breadth-first search technique, or the Dijkstra method, and stores the searched route as a guide route. During traveling, the guide route is drawn on the map image thicker with a different color than other roads, and when the vehicle approaches within a certain distance an intersection where it should change course on the guide route, an arrow is drawn on the map image to indicate the direction at the intersection that the vehicle should follow, to thereby guide the user to the destination.

Here, the cost represents the value obtained by multiplying the distance along the road by a constant specified in accordance with the breadth of the road, the type of the road (general road or highway, etc.), right-turn and left-turn, etc., and the estimated travel time of the vehicle, which shows the relative appropriateness of the guide route with a numeric value. Even if there are two routes having the same distance, the cost differs depending on whether the user takes a toll road or not, or whether the user gives preference to the travel distance or to the travel time.

The map stored in the map data storage unit such as a CD-ROM is partitioned into a latitude breadth and a longitude breadth of an appropriate size, in accordance with a scale such as $1/12500$, $1/25000$, $1/50000$, $1/100000$, etc., in which the roads are stored as coordinate sets of nodes expressed by the longitudes and the latitudes. The road includes connections of more than two nodes. The part connecting two nodes is named a link. The map data is configured with (1) a road layer including road lists, node tables, and intersection configuration node lists, etc., (2) a background layer for displaying roads, buildings, facilities, parks, rivers, etc., on the map, and (3) a character/symbol layer for displaying the characters and map symbols of administrative boundary names such as municipal names, road names, intersection names, names of buildings, etc. Further, the navigation system includes a mode to guide the user to a destination by means of an arrow display, rather than the foregoing system to display a map.

For the map display mode, the navigation system displays a vehicle mark indicating the vehicle position as well as a map of the area surrounding the vehicle, and always give the user the map information of the area surrounding the vehicle, whereby the user can find the current position of the vehicle at a glance.

A navigation system that does not have the map display mode, but gives route guidance to a destination only by the arrow display, can reduce the size of the display screen because it does not display a map. Further, the system guides the user with a simple arrow display, which the user can easily grasp at a glance during driving, which is safer while driving the vehicle.

In using a conventional navigation system, where a user sets a destination and travels a highway according to the route guidance, when the user suddenly wishes to stop by a facility off the highway, it is difficult to know the exit from which the user should exit the highway to reach the desired facility. For example, while traveling a highway to a destination, when the user wishes to stop by a restaurant for having a meal on the way, it is difficult with the conventional navigation system to effectively judge the exit from which the user should get off the highway to get to a nearest restaurant.

A navigation system that guides the user to a destination only by the arrow display instead of the map display is not provided with means to display facilities located along the guide route, during traveling on the guide route. Accordingly, when the user wishes to stop by a facility (for example, a gas station) located on the way while driving to the destination, it is difficult with the conventional navigation system to know which facilities are located along the guide route. Because it is difficult to know which facilities are available along the guide route, with a navigation system that executes route guidance only by the arrow display instead of the map display, the user is inconvenienced.

For example, while using the navigation system that guides the user to the destination by the arrow display without displaying a map, and traveling the guide route to the destination by following the arrow display, if the user desires to stop by a gas station to refill, since the conventional navigation system presents only the arrow display that guides the user to the destination, it is difficult to know how far the user should travel the guide route to reach the gas station.

Therefore, it is an object of the present invention to provide an on-vehicle navigation system that stores a list of facilities located within a specific distance from an exit of a highway for each exit of a highway, and facilitates searching for the facilities accessible from a next exit while traveling the highway.

Another object of the invention is to provide an on-vehicle navigation system which guides a user to a destination by an arrow display without displaying a map, which gives the user an easily understandable display of facilities located along the guide route.

SUMMARY OF THE INVENTION

In order to accomplish the foregoing objects, one aspect of the present invention provides an on-vehicle navigation system that guides a vehicle to a destination, which comprises: a vehicle position detection means that detects the current position of the vehicle; a map data storage means that contains map data including exits of a highway and facilities; a facility search means that searches, from the map data, facilities located within a specific distance from the next exit of the highway, on the basis of a vehicle position detected by the vehicle position detection means, while the vehicle travels the highway; and a display means that displays the facilities searched by the facility search means. The above configuration will search and display the facilities that can easily be accessed from the next highway exit during travel on the highway.

In accordance with another aspect of the invention, an on-vehicle navigation system that guides a vehicle to a destination by an arrow display without displaying a map comprises: a vehicle position detection means that detects the current position of the vehicle; a map data storage means that contains map data including positions and names of facilities; a destination input means for entering destinations; a guide route search means that searches a guide route to the destination entered by the destination input means; a facility search means that searches, from the map data, facilities located within a specific distance from the vehicle position which are located along the guide route searched by the guide route search means; and a display means that displays the facilities searched by the facility search means together with the distances from the vehicle position.

Thus configured, the on-vehicle navigation system that guides a vehicle to a destination by an arrow display without displaying a map will display the facilities located along the guide route together with the distances from the vehicle position.

Figure 1A:
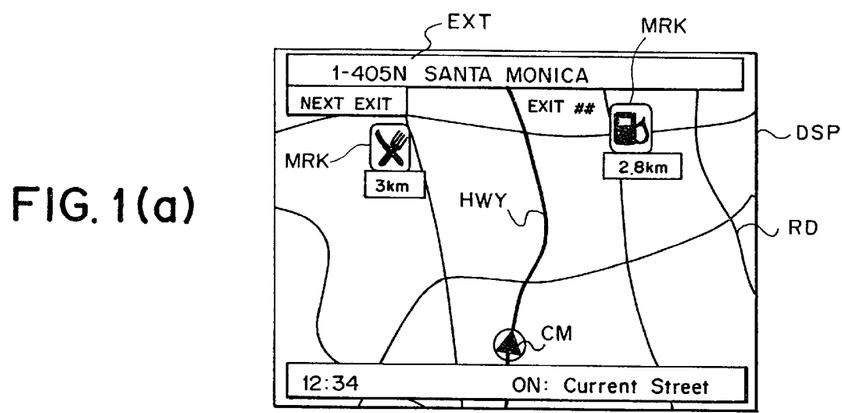
FIG. 1 is a schematic illustration of the present invention.
Figure 1B:
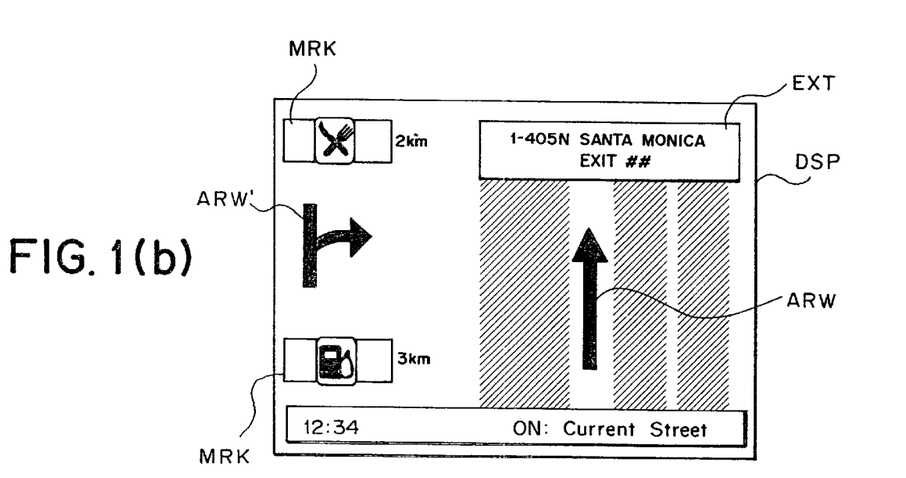

DETAILED DESCRIPTION OF THE PREFERRED EMBODIMENTS (A) Outline of the Invention FIG. 1 is a schematic illustration of the present invention. FIG. 1(a) illustrates a type of navigation system that displays a map, and FIG. 1(b) illustrates a type of navigation system that does not display a map but rather provides route guidance to a destination by means of an arrow display.

In FIG. 1(a), DSP signifies a display screen, HWY a highway, RD a general road, and CM a vehicle position mark that indicates the current position of a vehicle. Here, it is assumed that the vehicle is traveling on the highway. The system displays a next exit name EXT on the highway and a mark MRK indicating facilities located within a specific distance from the exit as well as the distance from the exit of the highway, which information is superimposed on the map image.

In FIG. 1(b), DSP signifies a display screen, ARW an arrow display that guides the vehicle travel direction, and EXT the name of a next highway exit. While the vehicle travels, the system displays the direction of the next exit by an arrow ARW and displays, by a symbol or a character, facilities located within a specific distance from the exit of the highway as well as the distance from the exit.

With the system thus configured, while traveling on a highway to the destination, the user is able to know the facilities that can be accessed easily from an exit on the way, as well as the distance from the exit, and to easily search a desired facility from the exit of the highway if the user is not familiar with the area.

(B) The First Embodiment

Figure 2:
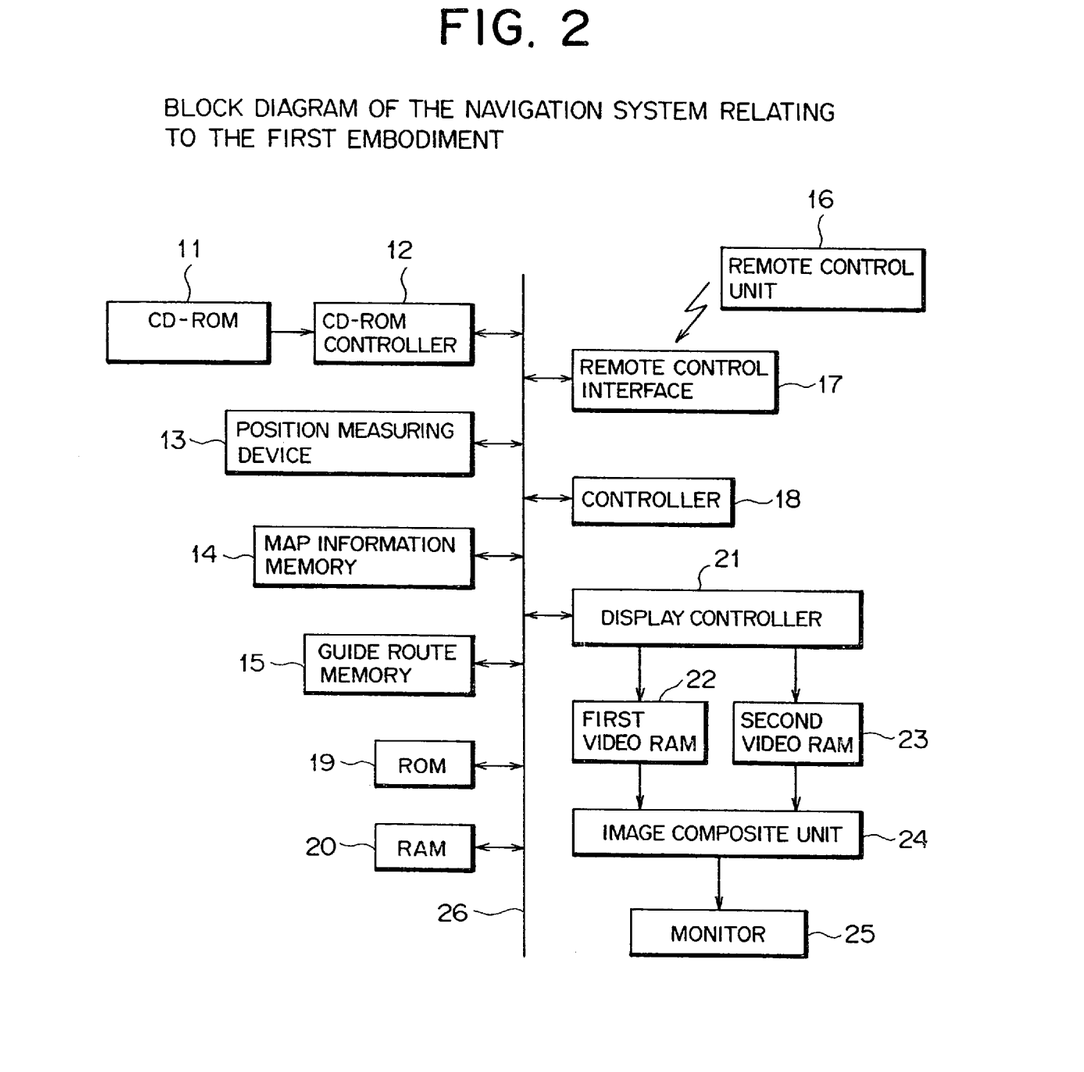
FIG. 2 is a block diagram of a navigation system according to a first embodiment of the invention.

FIG. 2 is a block diagram of a navigation system according to a first embodiment of the invention. In the drawing, 11 signifies a CD-ROM that contains map information of facilities located within a specific distance from an exit of a highway, 12 a CD-ROM controller that controls the reading of map information from the CD-ROM, 13 a position measuring device that measures the current vehicle position, which includes an azimuth sensor to detect a travel orientation such as a gyro, a distance sensor to detect a travel distance such as a speed sensor, a GPS receiver, a CPU for position calculation, etc. 14 signifies a map information memory to store map information read from the CD-ROM, 15 a guide route memory to store a guide route that is set, 16 a remote control unit having an operational console that operates a menu selection, map expansion/contraction, cursor movement (map scrolling), destination input, etc., and 17 a remote control interface.

Further, 18 denotes a controller that controls the entire navigation system, 19 a ROM that stores various programs for navigation (for example, a program to read a map corresponding to the vehicle position, a program to search a guide route to a destination, etc.), 20 a RAM for data storage, 21 a display controller that generates a map image and a menu image, 22 a first Video RAM that stores map images, 23 a second Video RAM that stores menu images, 24 an image composite unit that synthesizes a map image and a menu image to deliver the result, 25 a display unit (monitor) that displays the map image and the menu image that is output from the image composite unit, and 26 a bus line.

The CD-ROM 11 contains, in addition to map data information, information of facilities located within a specific distance from an exit of a highway as a list corresponding to each highway exit.

Figure 3:
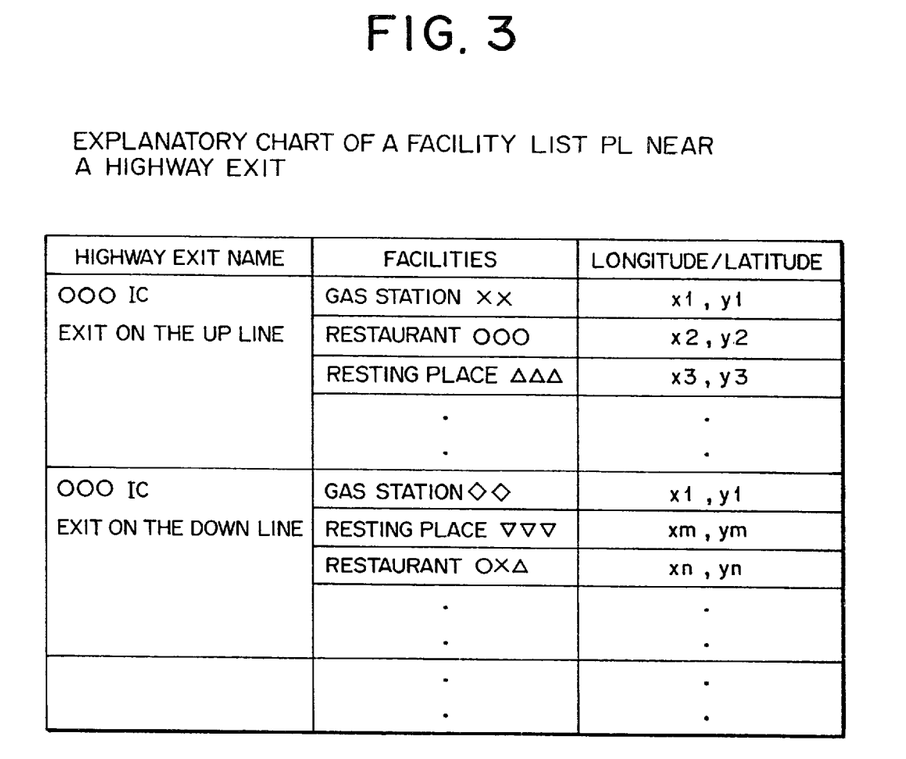
FIG. 3 is an explanatory chart of a list of facilities located near an exit of a highway.

FIG. 3 is an explanatory chart of a facility list PL near a highway exit, namely, a list of facilities located within a specific distance from a highway exit. The facilities list PL contains for each exit of a highway: (1) information on facilities located within a specific distance from an exit, and (2) longitude and latitude information (xi, yi) representing the position of each facility.

Figure 4:
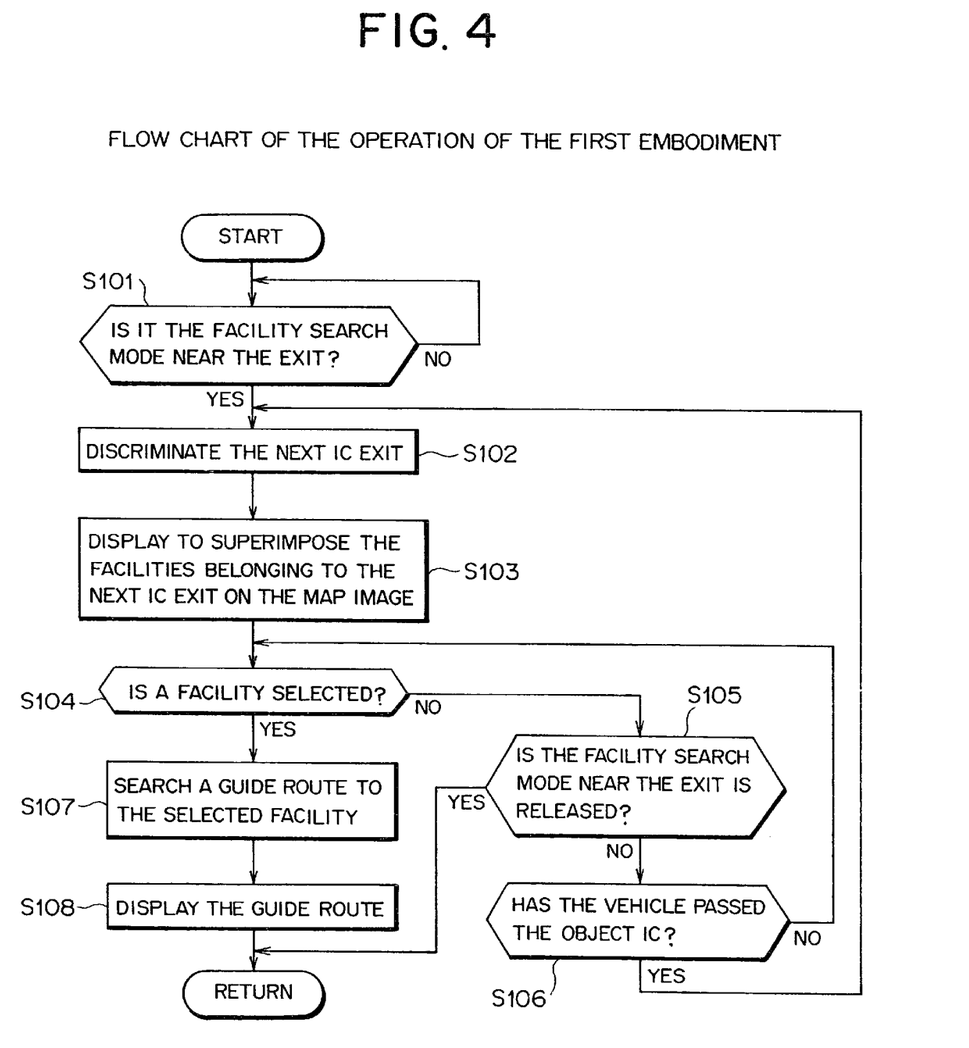
FIG. 4 is a flow chart explaining the operation of the navigation system relating to the first embodiment.

FIG. 4 is a flow chart of the operation of the first embodiment, in which a vehicle is assumed to be traveling on a highway. First, the controller 18 judges whether the menu selection operation by the remote control unit 16 selects the mode for searching facilities near a highway exit (step S101); and if not, the controller 18 waits until the mode for searching facilities near a highway exit is selected.

At step S101, if the mode for searching facilities near a highway exit is selected, the controller 18 discriminates the next highway exit from the current vehicle position measured by the position measuring device 13 and the map data contained in the CD-ROM 11 (step S102). The controller 18 controls the CD-ROM controller 12 to read from the CD-ROM 11 the facilities information near a highway exit stored in correspondence with the next exit, and displays the facilities information by superimposing it on the map image on the display screen (step S103).

Next, the controller 18 judges whether the user has selected a desired facility from among the facilities information displayed on the display screen (step S104). If a desired facility is not selected, the controller 18 judges whether the search mode of facilities near a highway exit is released or not (step S105). At step S105, if the search mode of facilities near a highway exit is released, the controller 18 completes the processing; and if not, the controller 18 judges whether the vehicle has passed the object highway exit on the basis of the current vehicle position measured by the position measuring device 13 (step S106). At step S106, if the vehicle has not passed the object highway exit, returning to step S104, the controller 18 repeats the processing; and if the vehicle has passed the object highway exit at step S106, returning to step S102, the controller 18 discriminates the next highway exit and continues the processing.

At step S104, if a desired facility is selected by the user, the controller 18 searches a guide route from the relevant highway exit to the selected facility, and stores the guide route in the guide route memory 15 (step S107). The controller 18 displays on the display screen the guide route to the facility stored in the guide route memory 15 at step S107, thereby guiding the vehicle (step S108).

Thus, while a vehicle is traveling on a highway, the navigation system is able to display a list of facilities located within a specific distance from the next exit, and to search a guide route to a facility selected from the list of facilities.

In the first embodiment, a navigation system of the type to display a map has been used as an example. However, a navigation system that guides a user to a destination by an arrow display instead of a map display is also able to make a character display of facilities located within a specific distance from the next exit of a highway as well as a distance from the exit of the highway. In this case, FIG. 1(*b*) illustrates a display example, which displays, in addition to the arrow display that shows a guide to a destination, facilities that can easily be accessed from the next highway exit together with the distances from the vehicle.

(C) The Second Embodiment

Figure 5:
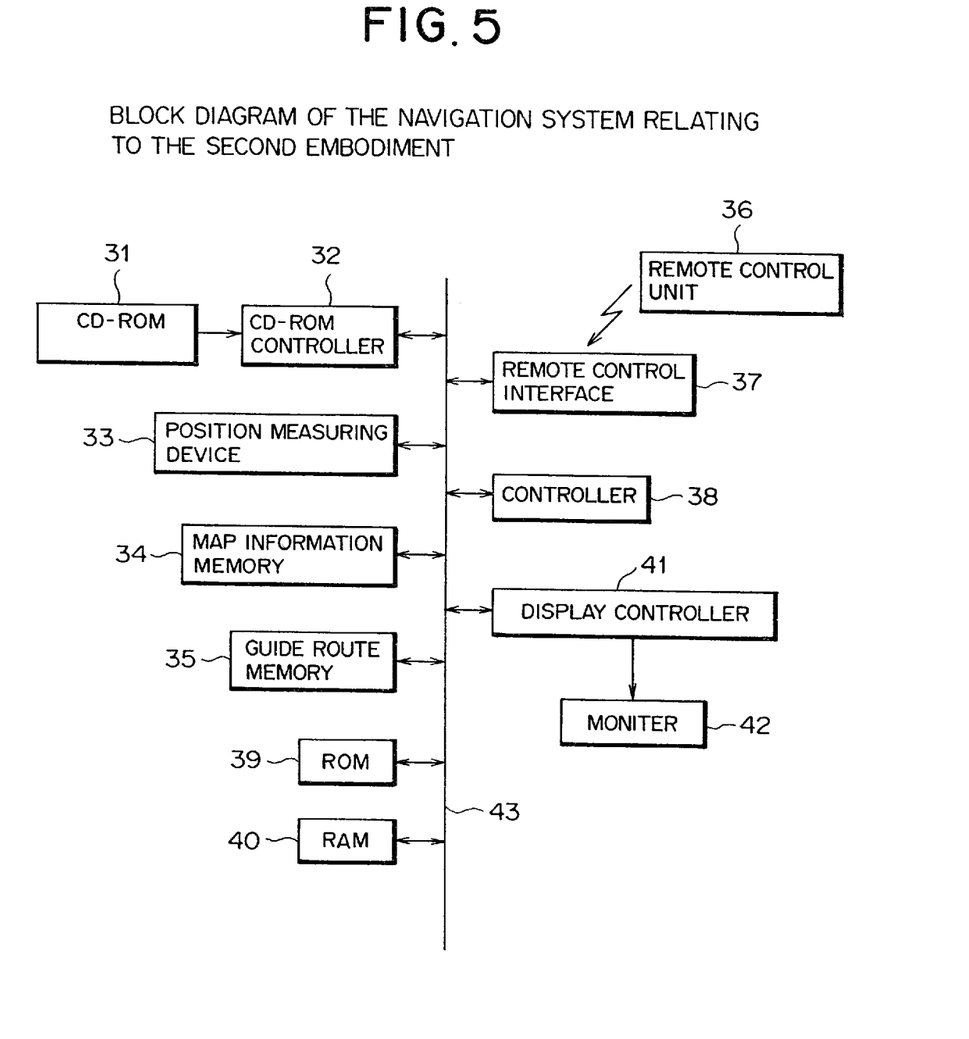
FIG. 5 is a block diagram of a navigation system according to a second embodiment of the invention.

The navigation system of the second embodiment guides a user to a destination by an arrow display without providing a map display. FIG. 5 is a block diagram of the navigation system of the second embodiment.

In FIG. 5, 31 denotes a CD-ROM that contains map information of positions, names, etc., of various facilities, 32 a CD-ROM controller that controls the reading of map information from the CD-ROM, 33 a position measuring device that measures the current vehicle position, which includes a gyro to detect travel orientation, a speed sensor to detect travel distance, a GPS receiver, a CPU for position calculation, etc. 34 signifies a map information memory to store map information read from the CD-ROM, 35 a guide route memory to store a guide route that is set, 36 a remote control unit that performs the operations of menu selection, destination input, etc., and 37 a remote control interface. Further, 38 denotes a controller that controls the entire navigation system, 39 a ROM that stores various programs for navigation (for example, a program to search a guide route to a destination, a guide program, etc.), 40 a RAM for data storage, 41 a display controller that generates an arrow display image for guidance, 42 a monitor, and 43 a bus line.

Figure 6:
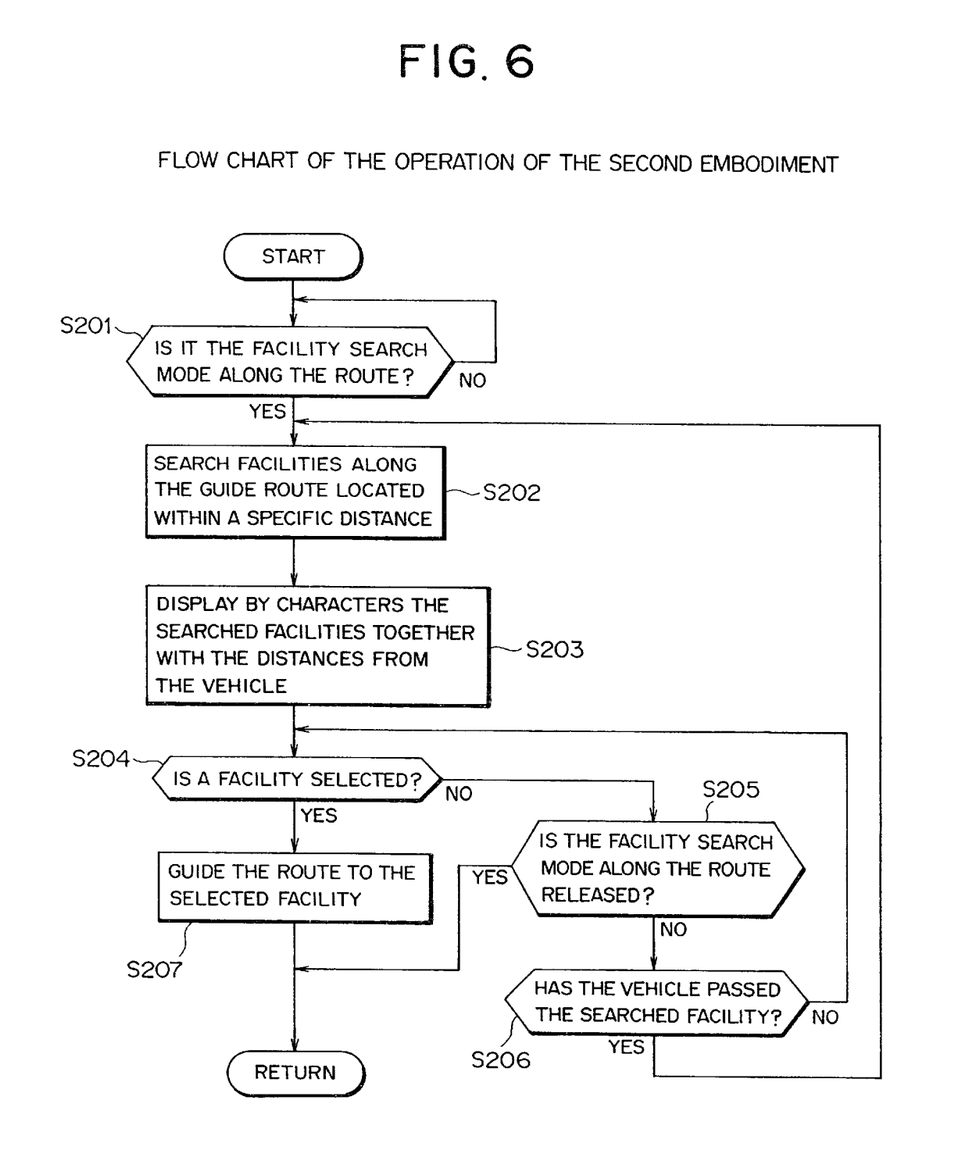
FIG. 6 is a flow chart explaining the operation of the navigation system relating to the second embodiment.

FIG. 6 is a flow chart of the operation of the second embodiment. Here, a user is assumed to be using a navigation system that performs route guidance to a destination by an arrow display instead of a map display, and is driving a vehicle on the guide route being a general road following the route guidance.

First, the controller 38 judges whether the user has operated the remote control unit 36 to select the facility search mode along the route (step S201). If not, the controller 38 repeats the step S201 until the user selects the facility search mode along the route.

At step S201, if the facility search mode along the route is selected, the controller 38 searches, on the basis of the map data contained in the CD-ROM 31, facilities along the guide route, located within a specific distance (for example, within 5 km) from the vehicle position, which are stored in the guide route memory 35 (step S202). Next, the controller 38 calculates the distances from the vehicle position to the searched facilities, and displays by characters the names of the searched facilities as well as the distances from the vehicle position (step S203).

Next, the controller 38 judges whether the user has selected a desired facility from the facilities displayed on the display screen (step S204). If a desired facility is not selected, the controller 38 judges whether the user has operated the remote control unit 36 to release the facility search mode along the route (step S205).

At step S205, if the facility search mode along the route is released, the controller 38 completes the processing. If not, the controller 38 judges whether the vehicle has passed the searched facility on the basis of the current vehicle position measured by the position measuring device 33 (step S206). At step S206, if the vehicle has not passed the searched facility, returning to step S204, the controller 38 repeats the processing. If the vehicle has passed the searched facility at step S206, returning to step S202, the controller 38 repeats the processing.

At step S204, if the user has selected a desired facility, the controller 38 instructs the guide route memory 35 to store the selected facility as a stopping point along the way, thus executing the route guidance.

With the configuration thus described, when the user is traveling a guide route by means of a navigation system that provides route guidance to a destination by an arrow display instead of a map display, the navigation system will search and display facilities along the guide route.

Further, in the descriptions of the first and second embodiments, the system is designed to search facilities by using map information stored in a recording medium such as a CD-ROM. However, the system may be designed to search facilities by using map information acquired through communication with media outside the vehicle.

Although the invention has been described in accordance with the forgoing embodiments, various changes and modifications are possible within the scope and spirit of the invention, as disclosed in the following claims, which should not be excluded from the invention.

Thus, according to the invention, since the system is made to display a list of facilities located within a specific distance from a next highway exit, the user is able to know the facilities that can easily be accessed from the next highway exit, while traveling the highway. Further, according to the invention, in a navigation system that guides the user to a destination by an arrow display instead of a map display, because the system is made to display for searching facilities within a specific distance from the vehicle position, which are located along the guide route, the user is able to know the facilities located along the guide route together with the distances from the vehicle, which provides the user a convenience.

What is claimed is:

1. A Point of Interest (POI) display method that associates with a highway exit a list of POIs located around the exit, wherein, while a vehicle is traveling the highway, the POIs associated with the next highway exit are displayed to be searched from the POI list and the name of the highway exit is displayed.

2. A POI display method as claimed in claim 1, wherein the names or marks of the POIs located around the highway exit are displayed together with the distances from the exit.

3. A POI display method as claimed in claim 1, wherein an arrow indicating the direction of the next highway exit is displayed.

4. A POI display method as claimed in claim 1, wherein a desired POI is selected from the displayed POIs, and a guide route from the highway exit to the selected POI is searched and displayed.

5. A POI display method as claimed in claim 1, wherein, whether the vehicle has passed the highway exit or not is judged, and when the vehicle is judged to have passed the exit, a POI associated with the next highway exit is displayed.

6. A POI display method as claimed in claim 1, wherein information of the POIs located around the highway exit is received from outside the vehicle.

7. A POI display method as claimed in claim 1, wherein the list of the POIs located around the highway exit is divided into the POIs associated with the exit from the highway in a first direction of travel and the POIs associated with the exit from the highway in a second direction of travel.

8. A POI display method as claimed in claim 7, wherein a travel direction of the vehicle is detected, and a POI associated with the travel direction is displayed.

9. A Point of Interest (POI) display method for a navigation system that executes guidance to a destination by an arrow display without displaying a map, the POI display method comprising the steps of:

searching a guide route to the destination, searching a POI located along the guide route, within a specific distance from a vehicle position, and displaying the searched POI together with the distance from the vehicle position.

10. A POI display method as claimed in claim 9, wherein the POI is displayed by name or a mark.

11. A POI display method as claimed in claim 9, wherein a desired POI is selected from the POIs displayed on a display screen, and route guidance is executed which regards the selected POI as a stopping point along the way.

12. A POI display method as claimed in claim 9, wherein the POI information is received from outside the vehicle.

13. An on-vehicle navigation system that guides a vehicle to a destination, comprising:

a vehicle position detection means that detects a current position of the vehicle;

a map data storage means that contains map data including exits of a highway and facilities;

a facility search means that searches facilities located near the next exit of the highway from the map data, on the basis of a vehicle position detected by the vehicle position detection means, while the vehicle travels the highway; and a display means that displays the facilities searched by the facility search means;

wherein the facility search means searches facilities located within a specific distance from the next exit of the highway.

14. An on-vehicle navigation system as claimed in claim 13, wherein the map data storage means stores a list of the facilities located around the highway exit and divided into the POIs associated with the exit from the highway in a first direction of travel and the POIs associated with the exit from the highway in a second direction of travel.

15. An on-vehicle navigation system as claimed in claim 13, wherein the display means displays searched facilities together with distances from the highway exit.

16. An on-vehicle navigation system that guides a vehicle to a destination by an arrow display without displaying a map, the navigation system comprising:

a vehicle position detector that detects a current position of the vehicle;

a map data storage that contains map data including locations and names of facilities;

a destination input device that inputs destinations;

a guide route searcher that searches a guide route to the destination that is input by the destination input device;

a facility searcher that searches, from the map data, facilities located within a specific distance from the vehicle position, which are located along the guide route searched by the guide route searcher; and a display device that displays the facilities searched by the facility searcher together with their distances from the vehicle position.

17. An on-vehicle navigation system as claimed in claim 16, wherein the display device displays searched facilities by names or marks.

18. An on-vehicle navigation system as claimed in claim 16, wherein the guide route searcher selects a desired facility from the facilities displayed on a display screen, and executes a route search which regards the selected facility as a stopping point along the way.

* * * * *